(12) United States Patent
Pampati et al.

(10) Patent No.: US 9,015,645 B1
(45) Date of Patent: Apr. 21, 2015

(54) HIERARCHICAL ELECTROMIGRATION ANALYSIS USING INTELLIGENT CONNECTIVITY

(71) Applicant: Oracle International Corporation, Redwood City, CA (US)

(72) Inventors: Vamshi Pampati, San Jose, CA (US); Tony Hoang, Mountain House, CA (US); Mini Nanua, Cedar Park, TX (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/062,491

(22) Filed: Oct. 24, 2013

(51) Int. Cl.
*G06F 17/50* (2006.01)
(52) U.S. Cl.
CPC .................................. *G06F 17/5081* (2013.01)
(58) Field of Classification Search
CPC .................................. G06F 17/50; G06F 15/04
USPC .......................................................... 716/55
See application file for complete search history.

(56) References Cited

U.S. PATENT DOCUMENTS 5,604,680 A * 2/1997 Bamji et al. ................. 716/118

* cited by examiner

*Primary Examiner* — Thuan Do
(74) *Attorney, Agent, or Firm* — Polsinelli PC

(57) ABSTRACT

Implementations of the present disclosure involve methods and systems for performing an electromigration analysis of a microelectronic circuit design. In particular, the implementations describe provide for performing a hierarchical extraction of the design, determining an approximate positioning and connection of two or more components of the design and performing electromigration analysis on the design. In one implementation, an intelligent connectivity may be applied to the hierarchical extraction to achieve an approximate location of the connection points between the blocks of the design. In one example, the intelligent connectivity technique may utilize a coordinate grid related to the design to approximate the connection points between the blocks of the design. Thus, by combining the hierarchical extraction with an intelligent connectivity technique, an electromigration analysis of a VLSI microelectronic design may be accomplished within the limitations of the analysis tools that is more accurate than previous electromigration analysis techniques.

18 Claims, 10 Drawing Sheets

HIERARCHICAL ELECTROMIGRATION ANALYSIS USING INTELLIGENT CONNECTIVITY

FIELD OF THE DISCLOSURE

Aspects of the present invention relate to computing systems and, more particularly, aspects of the present invention involve electromigration analysis of a very-large scale integration (VLSI) microelectronic design.

BACKGROUND

Computers or other executing devices are ubiquitous in today's society. They come in all different varieties and can be found in places such as automobiles, laptops or home personal computers, banks, personal digital assistants, cell phones, as well as many businesses. In addition, as computers become more commonplace and software becomes more complex, there is a need for the computing devices to perform faster and more reliably in smaller and smaller packages.

As the design of computing systems continues to increase in complexity in smaller and smaller packages, microelectronic system may undergo a process of electromigration. In general, electromigration is the gradual transport over time of material in a current carrying conductor due to momentum transfer between moving electrons and stationary ions. For example, in a VLSI microelectronic design due to the extremely small size of wires and huge current densities in those wires, electromigration may result in an open circuit (or loss of connection) or short circuit (as electromigration electrically connects two or more neighboring wires in the design). To provide a microelectronic design with a certain level of reliability, many VLSI designs will be put through an electromigration analysis during the design process. This electromigration analysis provides the designers with an estimate on how reliably the designed product will work under specified lifetime of the chip under specified target conditions and allows the designers to alter the design if needed to make it more robust and last its lifetime.

It is with these and other issues in mind that various aspects of the present disclosure were developed.

SUMMARY

One implementation of the present disclosure may take the form of a method for analyzing performance of a circuit. The method comprises the operations of obtaining a layout of a top level of the circuit, the layout comprising a position of a plurality of bounding boxes representative of a plurality of logical sub cells of the circuit and one or more representations of connectors, the connectors configured to provide an electrical connection between the plurality of logical sub cells and extracting, through a hierarchical extraction process, design information of the at least one logical sub cell of the plurality of logical sub cells, the design information comprising a pin layer of the logical sub cell comprising a plurality of connection locations. The method may also include locating a position of the bounding box of at least one logical sub cell relative to the top level of the circuit, determining an approximate location of an interface between the representations of one or more connectors and the bounding box of the at least one sub cell relative to the top level of the circuit and associating one of the plurality of connection locations of the pin layer of the logical sub cell with the approximate location of the interface.

Another implementation of the present disclosure may take the form of a system for an electromigration analysis of a circuit design. The system comprises a processing device and a computer-readable medium with one or more executable instructions stored thereon. The processing device executes the one or more instructions and performs the operations of accessing a top level layout of the circuit design, the layout comprising locations of a plurality of bounding boxes in the top level representative of a plurality of logical sub cells of the circuit and one or more representations of electrical connectors between the plurality of logical sub cells, overlaying the top level layout with a grid, the grid comprising a plurality of coordinates associated with locations on the top level layout and locating a relative grid position of the bounding box of at least one logical sub cell. In addition, the processor performs the operations of determining an approximate grid coordinate for at least one electrical connection location between the representations of the one or more electrical connectors and the bounding box of the at least one sub cell relative to the top level layout of the circuit, extracting, through a hierarchical extraction process, design information of the at least one logical sub cell of the plurality of logical sub cells and performing an electromigration analysis of the circuit utilizing the design information of the at least one logical sub cell and the approximate grid location coordinate of the at least one electrical connection location between the representations of the one or more electrical connectors and the bounding box of the at least one sub cell relative to the top level layout of the circuit.

DETAILED DESCRIPTION

Implementations of the present disclosure involve methods and systems for performing a hierarchical electromigration analysis of a microelectronic circuit design. In particular, the implementations describe herein provide for performing a hierarchical extraction of the design, determining an approximate positioning and connection of two or more components of the design and performing electromigration analysis on the two or more components of the design. In another implementation, the microelectronic design may be extracted through a flat extraction technique. However, because flat extraction of a microelectronic design includes expanding all hierarchies in the design with little to no reduction techniques applied, flat extraction may not be supported for large scale designs due to resource limitations of extraction and analysis tools. Thus, hierarchical extraction, as explained herein, may be used for complex and large microelectronic designs where flat extraction may not be possible.

Although a hierarchical extraction approach may allow for the extraction of very-large scale integration (VLSI) microelectronic designs, such extraction may introduce one or more inaccuracies over a flat extraction technique. In one particular example, hierarchical extraction may assume a connection point between two or more components or blocks of the overall microelectronic design. This assumption of connection points between the blocks introduces an inaccuracy to the hierarchical extraction. Thus, in one implementation of the present disclosure, an intelligent connectivity may be applied to the hierarchical extraction to achieve an approximate location of the connection points between the blocks of the design. Location of a correct connection is determined to aid in determining flow or current and thereby current densities of the design. In one example, the intelligent connectivity technique may utilize a coordinate grid related to the design to approximate the connection points between the blocks of the design. The intelligent connectivity may also obtain connectivity information for more complex designs, such as microelectronic designs that utilize pillar based connections between the blocks. Thus, by combining the hierarchical extraction with an intelligent connectivity technique, an electromigration analysis of a VLSI microelectronic design may be accomplished within the limitations of the analysis tools that is more accurate than previous electromigration analysis techniques.

Figure 1A:
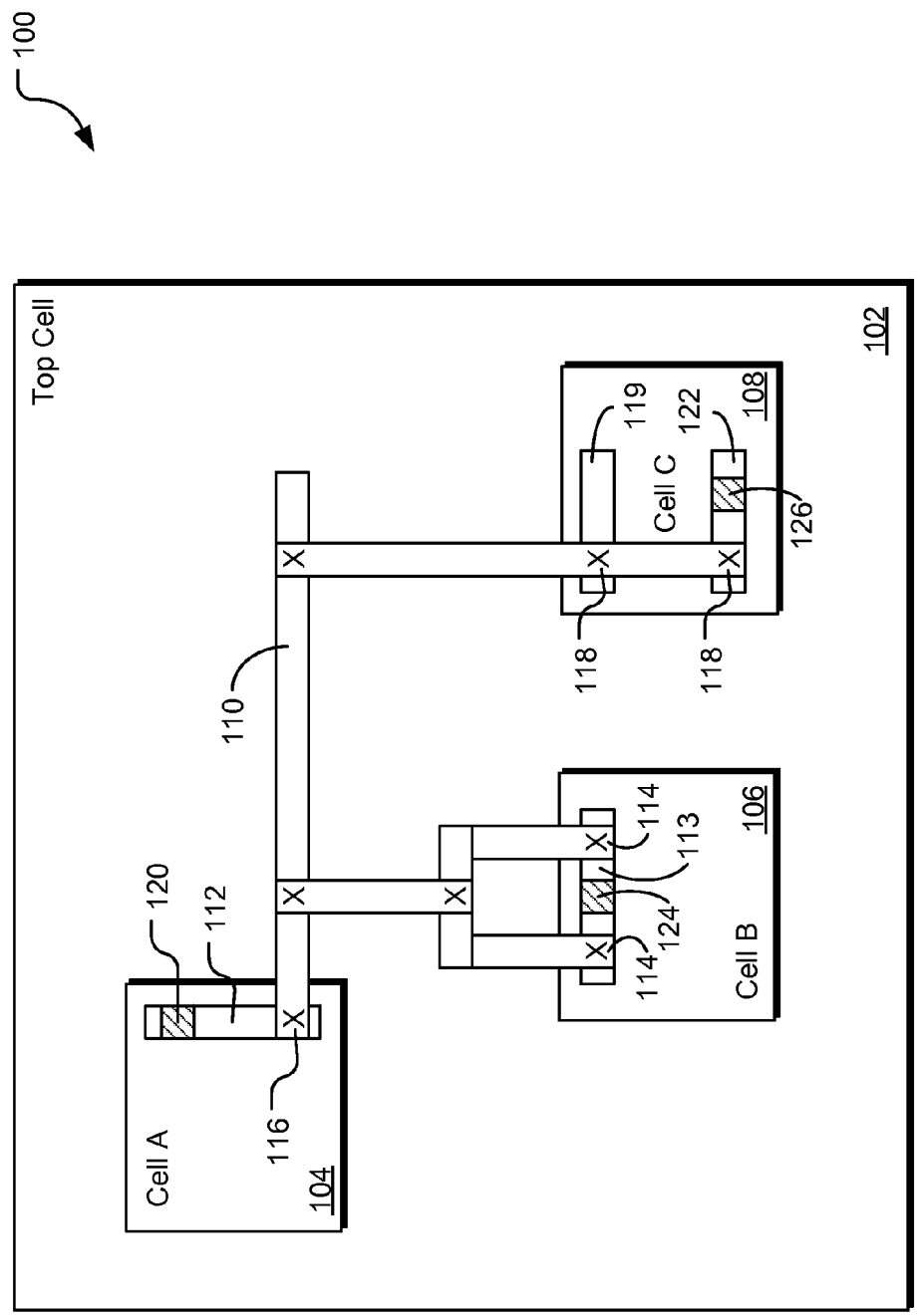
FIG. 1A is a schematic diagram illustrating a top-down view of a microelectronic design with multiple cells and connections between the cells after intelligent connectivity is applied to the design.

FIG. 1A illustrates a schematic diagram of a top-down view of a microelectronic design with multiple cells and connections between the cells. Several of the issues present when a hierarchical extraction of a VLSI microelectronic design is used prior to performing an electromigration analysis of the design is discussed below with reference to FIG. 1A. Thus, although the schematic diagram 100 of FIG. 1A only illustrates a few blocks of the overall design, it should be appreciated that any number of blocks, components, connections and the like may be included in the diagram. The particular example of FIG. 1 is included for simplicity sake.

As should be appreciated, the design 100 of FIG. 1A may be an approximation of a physical microelectronic circuit. In other words, the schematic illustration 100 of FIG. 1A may be obtained from a netlist or other approximation of a physical circuit design. The netlist may be created by a circuit designer or analysis tool to aid the designers of the circuit 100 in creating the VLSI design.

The illustration 100 of FIG. 1A includes a top cell 102 of the VLSI design. In particular, the top cell 102 includes one or more circuit blocks 104-108 within the top cell. The one or more blocks 104-108 shown in FIG. 1A represent functional portions or cells of the VLSI design 100. For example, cell A 104 may represent a memory cell of the VLSI design, while cell B 106 and cell C 108 may represent execution portions of the design, including one or more logic gates or other logic components. In general, however, the blocks 104-108 of the top cell 102 may have any function related to the operation of the VLSI design, as desired by the microelectronic circuit designer or analysis tool. Further, any block 104-108 of the top cell 102 may be the same or different from any other functional block of the design.

In addition to the functional blocks 104-108, the top cell 102 may also include one or more connectors 110 between the blocks. In one example of the VLSI design, the connectors 110 between the functional blocks 104-108 are one or more wires that electrically connect the functional blocks. Those of skill in the art will recognize that the connectors 110 between the blocks may take many forms in a VLSI design. An "X" is used in the Figures throughout this disclosure to indicate where two connectors are electrically connected. Thus, two connectors 110 that overlap to form an intersection that includes an "X" marker indicates an electrical connection between the intersecting connectors. Intersections of connectors 110 that do not include an "X" indicator are not electrically connected at the intersection. Further, as discussed in more detail below, the connectors 110 between the blocks 104-108 connect to each functional block in a particular location along a pin layer associated with each block. For example, cell A 104 includes pin layer 112 and cell B includes pin layer 113. Also, a functional block 104-108 may include any number of pin layers. For example, cell C 108 includes two pin layers 119, 122 that a connectors 110 may electrically contact to connect cell C with other functional blocks 104-106 of the design 100. Further, as shown in relation to cell B 106, a pin layer 113 associated with a cell may include two or more connection points 114 to the connectors 110 to electrically connect cell B with other cells 104, 108 of the design 100.

The above described connection information of the design 100 is generally maintained when the circuit design is extracted through a flat extraction technique. In particular, the connection points 114-118 between the cells 104-108 and the connectors 110 along the corresponding pin layers (112, 113, 119) of the cells is maintained through a flat extraction of the circuit design 100. However, as mentioned above, flat extraction may not be available for some VLSI circuit designs due to analysis tool constraints. Thus, a hierarchical extraction process may be used to obtain a netlist of the circuit 100 that can be further analyzed. But, as explained in more detail below, such hierarchical extraction includes inaccuracy within the extraction that degrade the accuracy of any analysis performed on the extracted design, including electromigration analysis of the circuit.

In general, a hierarchical extraction of a circuit design includes partitioning the circuit into a plurality of sub-blocks and extracting each sub-block individually. In one example, the circuit is partitioned into sub-blocks based on the functionality of the sub-blocks. Once extracted, the sub-blocks can be analyzed individually to receive the analysis results on that particular sub-block. For example, an electromigration analysis can be performed on each sub-block, as each sub-block analysis would likely be within the capabilities of the analysis tool. Further, because some sub-blocks of a circuit design have the same functionality or design, the analysis may be performed on a single instance of the sub-block and duplicated for the other instances of the sub-block in the design. In this manner, the time and computer processing power needed for the analysis may be significantly reduced.

At the top cell 102 of the design 100, an assumption is made by the analysis tool as to the location of the connection points 114-118 of the cells to the connectors 110 in a hierarchical extraction. In other words, because hierarchical extraction performs extraction of the top level only without considering the sub blocks, the extraction tool assumes the top level is making connection to the sub blocks at the location where there is a label. In particular, the extraction and/or analysis tool assumes a general location for the connection points 114-118 of the cells 104-108 of the design 100. For example, the tool may assume the connection point 120 for cell A 104 in the circuit design 190 of FIG. 1B when the actual connection point 116 is at a different location on the pin layer 112 of the cell. In one particular embodiment, the tool assumes the connection point for any connector 110 to the pin layer 112 of the cell 104 at the label location provided by the tool or a designer. However, this label location 120 may not correspond to the actual connection point 116 of the cell 104. By assuming a connection point 120 of the connector 110 to the cell pin layer 112, an inaccuracy is introduced into the extraction and analysis of the circuit. In an electromigration analysis, the wire length of the pin layer 112 between the assumed connection point 120 and the actual connection point 116 is an error in the analysis that may make the electromigration analysis inaccurate, as the flow of current or current density varies based on where the two wires connect.

Other inaccuracies also exist when utilizing a hierarchical extraction technique to analyze a circuit. For example, cell B 106 of the circuit 100 of FIG. 1A includes two connection points 114 on a single pin layer 113 connector (designated by the "X" on the intersection of the connector and the pin layer). This type of connection is known as a pillar connection. However, similar to the situation described above, a hierarchical extraction of the circuit 100 would assume a single connection point 124 along the pin layer 113 of the cell 106, such as the label location of the pin layer. Thus, the hierarchical extraction would fail to account for the pillar connection scheme of cell B 106 by assuming a single connection point 124. As such, an inaccuracy is introduced into the electromigration analysis. Similarly, cell C 108 of the circuit 100 includes a first pin layer 119 and a second pin layer 122 that connect to a single connector 110 at connection points 118. However, a hierarchical extraction would not indicate that pin layer 119 and pin layer 122 are electrically connected by connector 110. Rather, the extraction assumes a single connection point 126 (as the tool assumes a connection based on a position of a label for the pin layer) for both pin layers 119, 122 without an indication that the pin layers are electrically connected (as shown by the lack of an "X" marker at the intersection of pin layer 119 and connector 110). This inaccuracy is also introduced into the electromigration analysis of the circuit 100. Thus, although a hierarchical extraction of the circuit design 100 can be performed within tool capabilities; such an extraction technique introduces several errors that render analysis of the circuit, such as an electromigration analysis of the circuit, inaccurate.

Figure 1B:
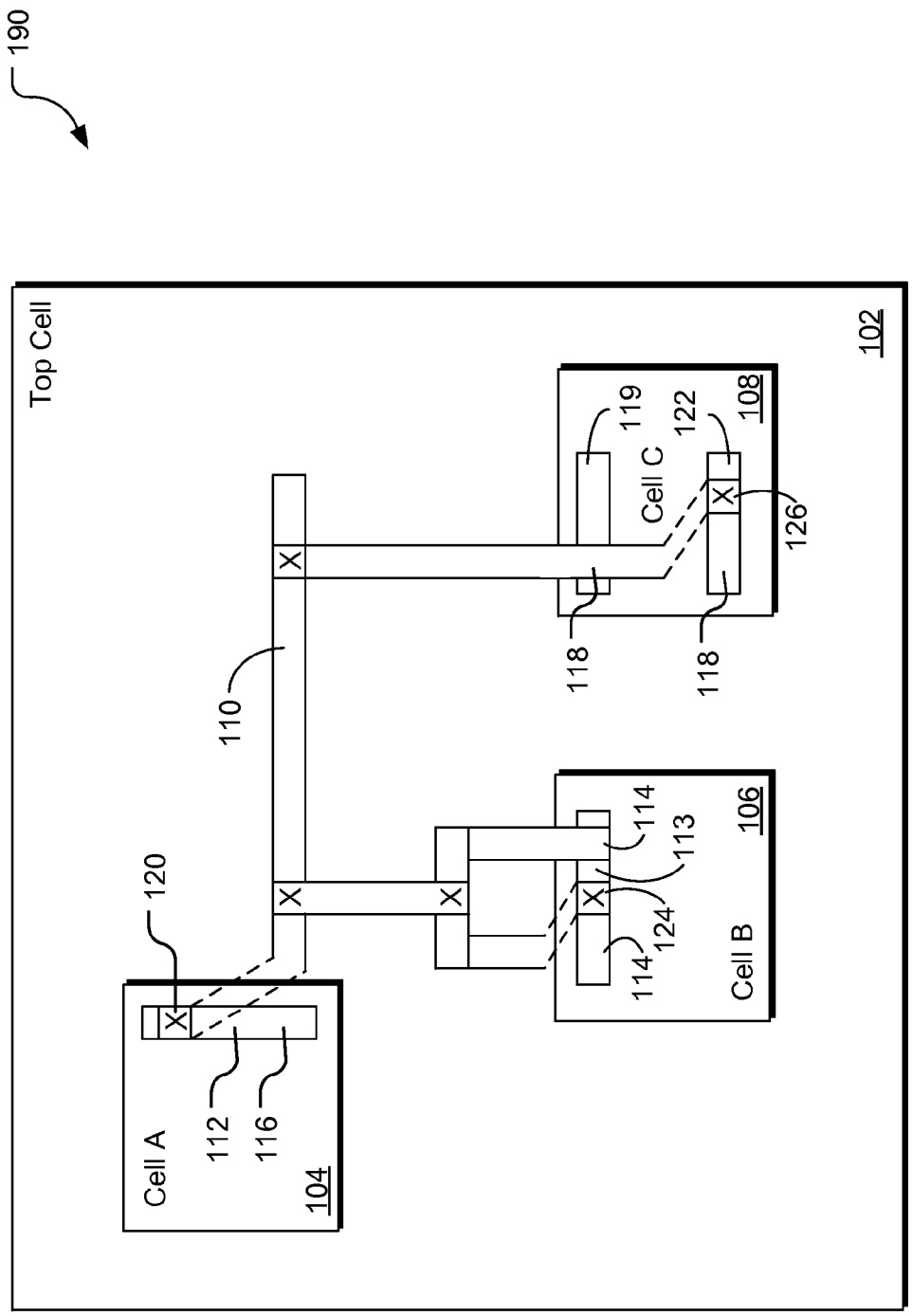
FIG. 1B is the schematic diagram of FIG. 1A before intelligent connectivity is applied to the design.

The assumed connection points (120, 124, 126) are illustrated in the schematic of FIG. 1B. FIG. 1B is the schematic diagram of FIG. 1A that illustrates the assumed connection points (120, 124, 126) obtained during a hierarchical extraction of the circuit design. Thus, the components illustrated in FIG. 1B are the same as those discussed above with reference to FIG. 1A and include similar numerical designations. In this case, however, the assumed connection points (120, 124, 126) obtained from a hierarchical extraction of the circuit design and indicated by the "X" marker at the intersection of the connectors 110 and the pin layers (112, 113, 122) do not correspond with the actual connections 114-118 illustrated in FIG. 1A. This inaccuracy between the actual connection points 114-118 to the cells 104-108 and the assumed connection points (120, 124, 126) may make an analysis of the circuit design, such as an electromigration analysis, similarly inaccurate.

In response to the inaccuracy that accompany the hierarchical extraction of a circuit design, one embodiment of the present disclosure provides an intelligent connection location technique to more accurately locate the connection to a cell of the design. In general, the embodiment utilizes a coordinate system to identify the actual connection point to the cell. Once the coordinates to the actual connection point is known, the embodiment associates that actual connection point to a possible connection point on the pin layer of the cell that corresponds to the actual connection point. As should be appreciated, electromigration analysis of the circuit using an approximation of the actual connection point to the cell would provide a more accurate analysis of the circuit, providing a more robust and reliable circuit design.

Figure 2A:
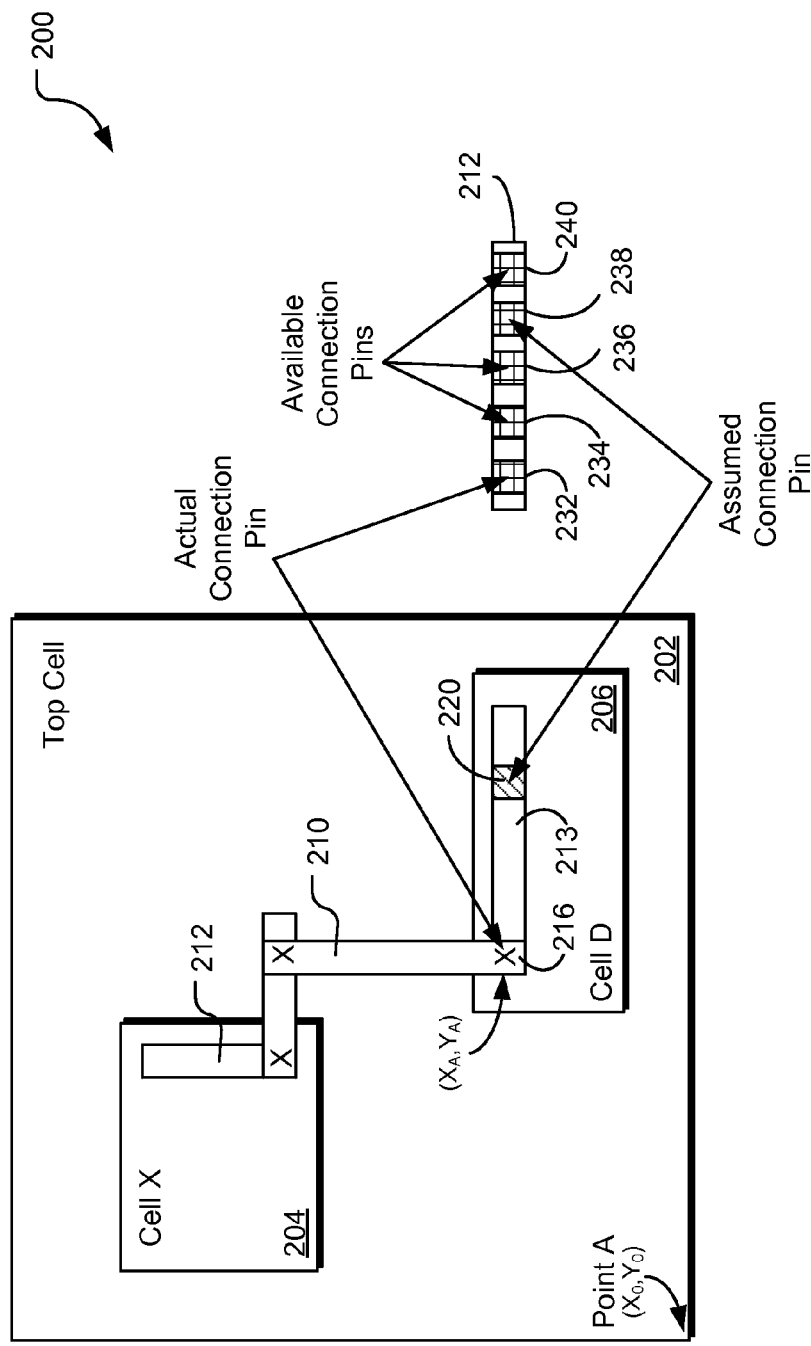
FIG. 2A is a schematic diagram illustrating a top-down view of a portion of a microelectronic design including multiple cells with a single connection between the cells after intelligent connectivity is applied to the design.

FIG. 2A is a schematic diagram illustrating a top-down view of a portion of a microelectronic design including multiple cells with a single connection between the cells. In particular, the circuit 200 of FIG. 2A includes a top cell 202 that illustrates two sub-cells, cell X 204 and cell D 206. The cells 204, 206 of the circuit 200 are for illustrative use. In general, the circuit 200 may include any number of cells connected in any type of connection scheme through one or more connectors 210, with electrically connected connectors indicated in FIG. 2A by the "X" marker. Each cell 204, 206 of the circuit 200 includes a pin layer 212, 213 for electrically connecting the cells through the one or more connectors 210.

Figure 2B:
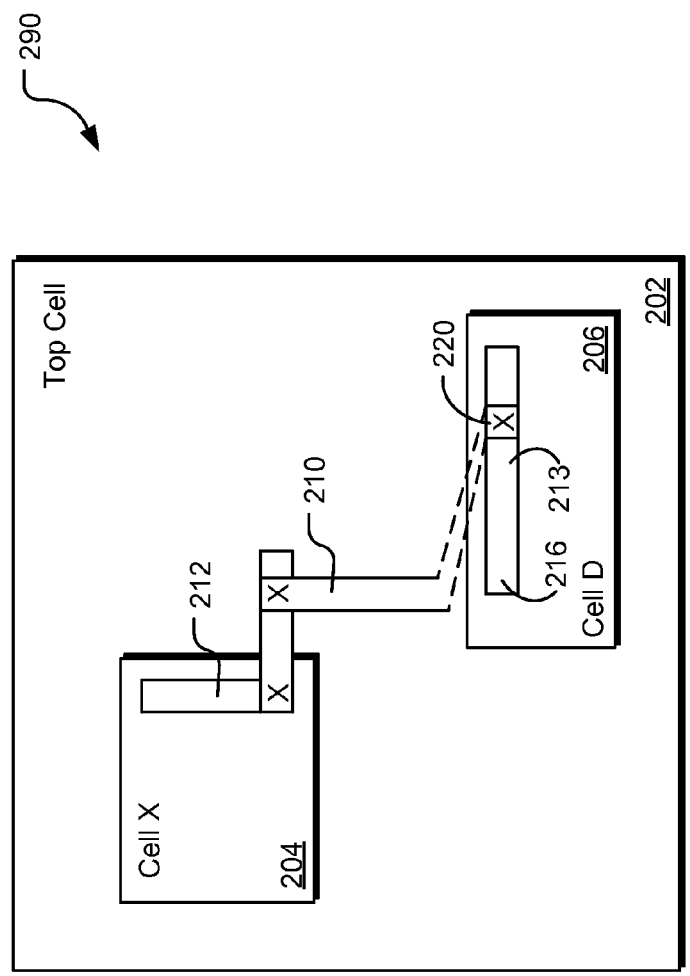
FIG. 2B is the schematic diagram of FIG. 2A before intelligent connectivity is applied to the design.

Similar to the circuit discussed above, cell D 206 of the circuit 200 of FIG. 2A includes an actual connection point 216 on the pin layer 212 to the connector 210 and an assumed connection point 220 that is used in a hierarchical extraction of the circuit. The assumed connection point 220 is best illustrated in the schematic of FIG. 2B. FIG. 2B is the schematic diagram of FIG. 2A that illustrates the assumed connection points 220 obtained during a hierarchical extraction of the circuit design 200. Thus, the components illustrated in FIG. 2B are the same as those discussed above with reference to FIG. 2A and include similar numerical designations. In this case, however, the connector 210 is connected to the assumed connection point 220 obtained from a hierarchical extraction of the circuit design 200. This assumed connection point 220 does not correspond with the actual connection point 216 of the circuit 200, as illustrated in FIG. 2A. The inaccuracy between the actual connection point 216 to cell D 206 and the assumed connection point 220 may make an analysis of the circuit design, such as an electromigration analysis, similarly inaccurate. In response, one embodiment of the present disclosure uses a coordinate system to determine a pin connector of the pin layer 213 that closely matches the actual connection point 216.

In particular, the pin layer 213 is expanded in FIG. 2A to illustrate the connection pins 232-240 of the pin layer. In general, the pin layer 213 may include any number of connection pins 232-240 at which a connector 210 can electrically connect to the cell 206. In the example shown in FIG. 2A, the pin layer 213 has five connection pins 232-240. As is discussed in more detail below, connection pin 232 of the pin layer 213 corresponds to the actual connection point 216 where the connector 210 of the circuit 200 electrically connects cell D 206 with cell X 204. Further, connection pin 238 corresponds to the label point 220 (and assumed connection point) applied to the pin layer 213 during extraction. The pin layer 213 between connection pin 232 (the actual connection point) and connection pin 238 (the assumed connection point or label location) is the inaccuracy present in the hierarchical extraction of the circuit. The pin layer 213 may include other connection pins 234, 236 and 240 that are unused in the circuit diagram of FIG. 2A.

In response to this inaccuracy, the embodiment illustrated associates the actual connection point 216 to the connection pin 232 of the pin layer 213 that is the closest to the actual connection point. By utilizing the connection pin 232 that closely resembles the actual connection point 216, an analysis of the circuit, including an electromigration analysis, is improved. One method to associate the actual connection point 216 to a corresponding connection pin 232 of the pin layer 213 is illustrated in the flowchart of FIG. 3.

Figure 3:
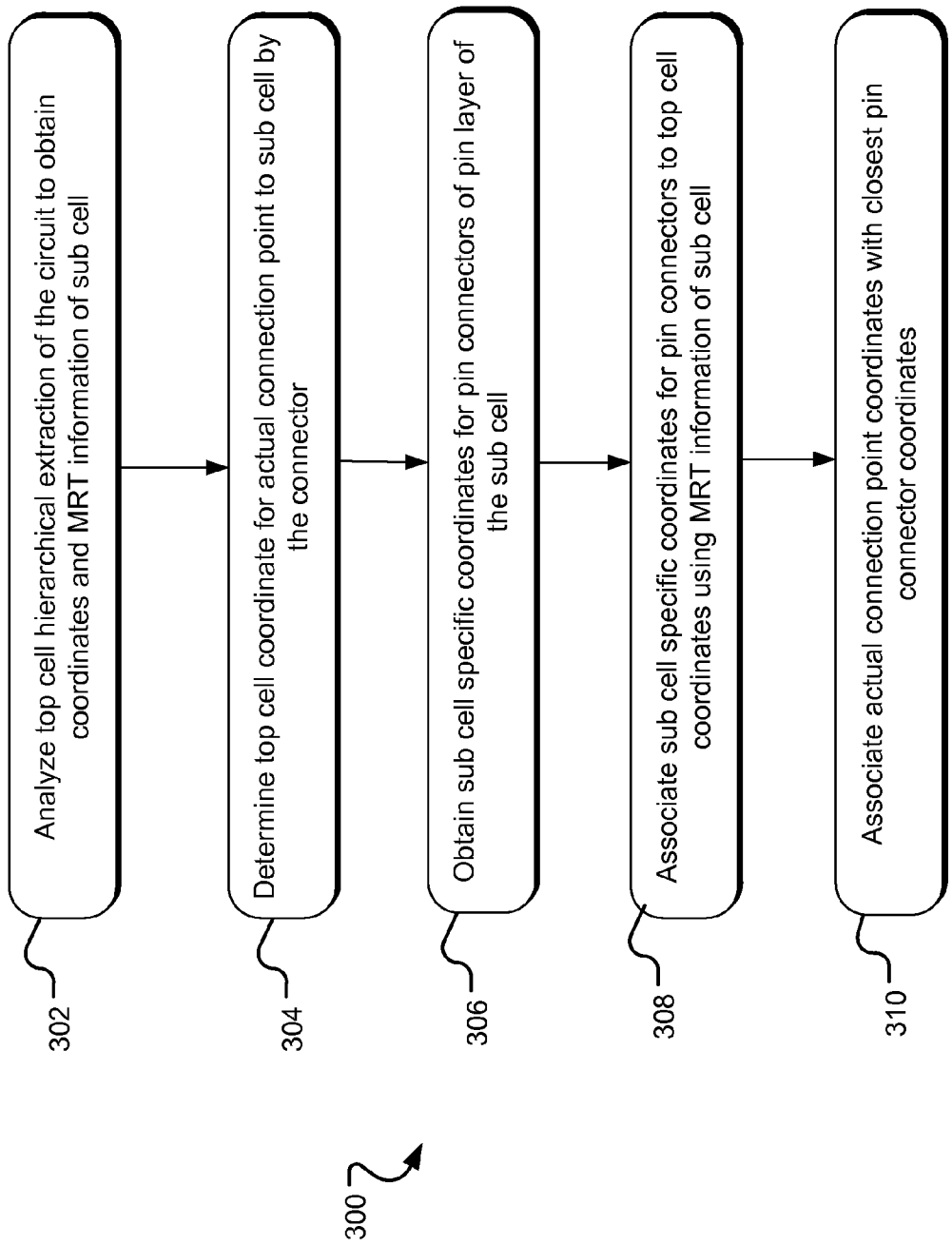
FIG. 3 is a flowchart of a method for utilizing coordinates of a microelectronic design to determine an approximate location of a connection point between two cells of microelectronic design.

FIG. 3 is a flowchart of a method for utilizing coordinates of a microelectronic design to determine an approximate location of a connection point between two cells of microelectronic design. In general, the operation of the flowchart of FIG. 3 may be performed by an analysis tool configured to perform extraction and/or analysis of a VLSI circuit design. The method may be incorporated with a hierarchical extraction of the circuit to improve the accuracy of an analysis conducted on the circuit. Reference is made to the circuit example of FIG. 2A in discussing the operations of the method.

Beginning in operation 302, the tool extracts the top cell hierarchically, such that the top level data is extracted without diving down into the subcells. It will also extract the mirror-rotation-translation (MRT) information of the subcells which helps to find the orientation of those subcells in top design. Using the circuit 200 of FIG. 2A as an example, the tool may extract the top cell 202 of the circuit 200. In general, the top cell extraction provides an indication of the location on a semiconductor chip of one or more functional sub-blocks of the circuit and the connection information between the one or more sub-blocks. For example, the top cell 202 of FIG. 2A includes sub-cell X 204 and sub-cell D 206 and the connector 210 between the cells. In addition, the top cell 202 may include the pin layers 212, 213 of one or more of the sub-cells 204, 206 to provide a location in the sub-cell through which connection to the connector 210 is made.

In one embodiment, the top cell 202 extraction information can be associated with a grid such that the location of the components of the top cell can be determined in relation to the top cell grid. In one embodiment, the grid is a Cartesian coordinate system that assigns an X-value and Y-value to each point in the grid. In the example of FIG. 2A, the lower leftmost corner of the top cell (point A) may be assigned an X-value of 0 and a Y-value of 0, illustrated in the Figure as coordinates $X_0$ and $Y_0$. However, although Cartesian coordinates are used in the examples provided herein, it should be appreciated that any mapping or grid techniques known or hereafter developed may be used to provide a relative location of points in the top cell 202.

Through the use of the top cell coordinate system, the relative position of each sub-cell 204, 206 in the top cell 202 is determined. For example, the corners that define the box bounding cell D 206 in the top cell 202 layout have coordinate positions in the grid of the top cell. These corner coordinates define the location of the sub-cell 206 within the top cell 202 layout. A similar technique also provides the location of any additional sub-cells 204 of the top cell 202 in addition to the location, orientation and length of each connector 210 of the top cell. In this manner, each component associated with the top cell 202 can be located in relation to the grid system of the top cell.

Further still, each sub cell 204, 206 may include mirror-rotation-translation (MRT) information associated with each cell. In general, the MRT information of a sub cell in a circuit design indicates the orientation of the sub cell. For example, two separate sub cells in the design may perform the same functionality or have the same design. However, these sub cells may be oriented on the top cell 202 in different manners. The MRT information of each of the instantiations of the sub cell indicate whether the sub cell is mirrored, rotated or translated in reference to a generic instance of the sub cell. This information provides a general orientation and footprint of the sub cell so that a clear understanding of the sub cell can be used by the analyzing tool. For example, by obtaining the corner coordinates of a sub cell and the MRT information, an analyzing tool may determine the location of the pin layer 213 associated with the sub cell. More particularly, as sub cell instantiations are rotated, mirrored or translated, the location of the pin layer 213 within the sub cell is altered. Thus, the corner coordinates of the sub cell provide the location of the sub cell within the top cell, while the MRT information provides the location of the components that are located within the sub cell. With this information, coordinates for the sub cells, components within the sub cells and the connectors are obtained by the analysis tool.

Through the analysis of the top cell 202 described above, the analysis tool determines the top cell coordinate for an actual connection point 216 between a sub cell 206 and a connector 210 in operation 304. In particular, the analysis of the top cell 202 provides the location coordinates of the connector 210 and the sub cell 206. Further, through the MRT information of the sub cell 206, the location of the pin layer 213 of the sub cell is identified. Thus, in operation 304 of FIG. 3, the analysis tool determines the intersection point of the connector 210 and the pin layer 213 of the sub cell to identify the location of the actual connection point 216. As shown in FIG. 2, the actual connection point is located at coordinate position $(X_A, Y_A)$. This coordinate position represents the closest grid position for the actual connection point 216 of the connector 210 to the cell 206. The accuracy of the coordinate position $(X_A, Y_A)$ to the actual physical connection point 216 is based on the parameters of the grid applied to the top cell 202, such that a finer grid provides a more accurate coordinate position.

With the coordinates for the actual connection point 216 determined, the analysis tool begins analyzing the sub cell 202. In particular, the analysis tool determines cell specific coordinates or locations of one or more pin connectors of the pin layer 213 of the cell 206. Similar to the coordinate grid of the top cell 202, the sub cell 206 may include a Cartesian cell specific coordinate grid. The cell specific coordinate grid may be similar to the grid of the top cell 202 such that the lower leftmost corner of the cell 206 has a cell specific coordinate value of (0,0). In addition, as explained above, the pin layer 213 for the cell 206 may include any number of possible pin connectors 232-240 to connect the cell to a connector 210. Thus, the pin connectors 232-240 have a cell specific coordinate location that identifies the location of the pin connectors within the cell 206.

For example, the pin layer 213 of FIG. 2A includes five pin connectors, pin 232, pin 234, pin 236, pin 238 and pin 240. Utilizing a cell specific coordinate grid, connector pin 232 has cell specific coordinate location of $(X_1, Y_1)$, connector pin 234 has cell specific coordinate location of $(X_2, Y_2)$, connector pin 236 has cell specific coordinate location of $(X_3, Y_3)$ and so forth. However, these coordinate locations are specific to the grid of the particular cell 206 in which the pin connectors 232-240 are located. However, as shown in operation 308 of FIG. 3, the cell specific coordinate positions of the pin connectors 232-240 of the pin layer 213 of the cell 206 can be translated to associated coordinate positions in relation to the top cell 202. This translation may utilize the coordinates of the cell 206 in relation to the top cell 202 grid, the MRT information of the cell to determine the orientation of the cell within the top cell, and the cell specific coordinates of the pin connectors 232-240 of the pin layer 213 of the cell. With this information, the analysis tool determines the top cell 202 coordinates for the pin connectors 232-240 of the pin layer 213 of the cell 206.

With the top cell coordinates for the actual connection point 216 and the top cell coordinates for the pin connectors 232-240 of the pin layer 213, the analysis tool associates the actual connection point to one of the pin connectors of the pin layer in operation 310 of FIG. 3. In particular, the analysis tool may use a Manhattan distance calculation to determine the distance from the actual connection point 216 coordinates and each of the pin connector 232-240 coordinates. The pin connector 232-240 with the shortest distance to the actual connection point 216 is then used as the connection point during an analysis of the circuit 200. In reference to FIG. 2, actual connection point 216 of the top cell 202 is associated with pin connector 232 of the pin layer 213 as the location of the connector 210 to the cell 206.

Through the method described above, the connector pin 232 of the pin layer 213 is identified as the pin that connects cell D 206 to the connector 210. This identification is made without the need to perform a flat extraction of the entire circuit 200. Rather, a hierarchical extraction may be performed on the cells of the circuit, with the benefits of such an extraction explained above. Further, the identification removes the inaccuracies that a hierarchical extraction introduces into a circuit analysis. In particular, the hierarchical extraction may assume the connection point to be at connector pin 238 and not connector pin 232. The distance between the assumed connection point 238 and the actual connection point 232 introduces an inaccuracy into any electromigration analysis performed on the circuit. However, through the method above, the closest connector pin 232 to the actual connection point 216 is determined and used during analysis, thereby removing the inaccuracy introduced through the hierarchical extraction. In this manner, a more accurate electromigration analysis may be performed within the limitations of the analysis tool.

Figure 4A:
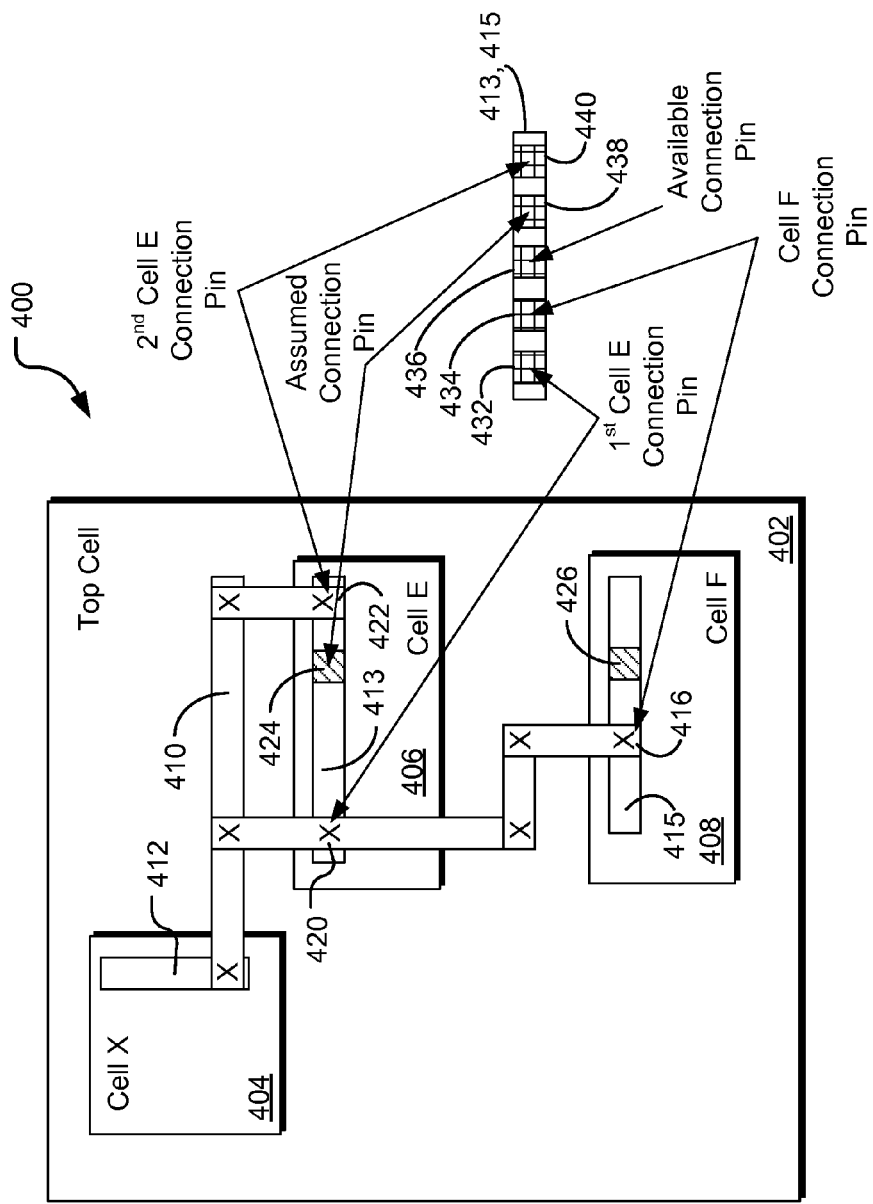
FIG. 4A is a schematic diagram illustrating a top-down view of a portion of a microelectronic design including multiple cells with a multiple or pillar-type connection to at least one cell after intelligent connectivity is applied to the design.

The techniques described herein may also account for different type of connections schemes utilized in circuit design. For example, FIG. 4A is a schematic diagram illustrating a top-down view of a portion of a microelectronic design 400 including a cell with multiple or pillar-type connections between the cells. In particular, the circuit 400 of FIG. 4A includes a top cell 402 that illustrates three sub-cells, cell X 404, cell E 406, and cell F 408. The cells 404-408 of the circuit 400 are for illustrative use. In general, the circuit 400 may include any number of cells connected in any type of connection scheme through one or more connectors 410. In addition, in the embodiment illustrated in FIG. 4A, cell E 406 and cell F 408 are different instantiations of the same cell type. Each cell 404-408 of the circuit 400 includes a pin layer 412, 413, 415 for electrically connecting the cells through the one or more connectors 410.

Cell F 408 is connected to the connectors 410 in a similar manner as discussed above with reference to the circuit of FIG. 2A. In particular, the cell 408 connects to the connector 410 through a single connector pin 434 of the pin layer 415. Also similar to the circuit of FIG. 2A, an analysis tool may assume a connection point 426 at pin connector 438 when hierarchical extraction is performed on the circuit 400. Through the utilization of the method of FIG. 3, the actual connection point 416 at connector pin 434 of the pin layer 415 may be determined by the analysis tool and used during electromigration analysis of the circuit.

Cell E 406 of the circuit 400 includes multiple or a pillar-type of connection to the connector 410. In particular, the connector 410 connects to the pin layer 413 of cell E 406 at connection point 420 and connection point 422. Through the method described above, these connection points can be associated with connector pin 432 and connector pin 440 of the pin layer 413 of the cell 406, respectively. Further, a hierarchical extraction of the circuit 400 would assume a single connection point 424 at connector pin 438 for cell E 406. Several inaccuracies are then introduced to an analysis of the circuit through the assumption of a single connection point 424, including the current on the pin layer 413 between the assumed connection point and the actual connection points 432, 440 and the presence of multiple connection points to the pin layer. Thus, by utilizing the intelligent coordinate grid to identify the locations and number of connections to the pin layer 413, an electromigration analysis of the circuit 400 becomes more accurate and reliable.

Figure 4B:
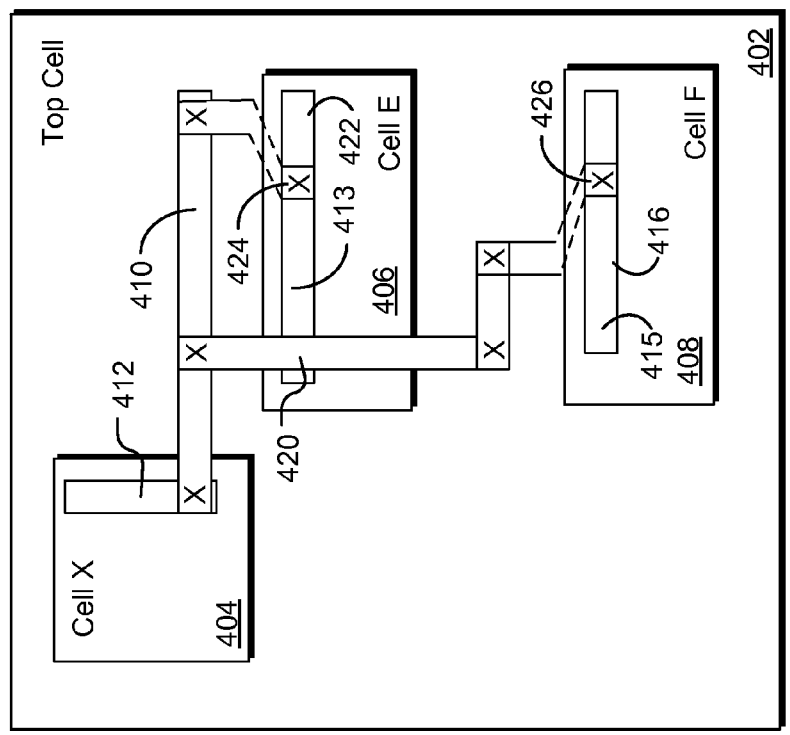
FIG. 4B is the schematic diagram of FIG. 4A before intelligent connectivity is applied to the design.

An assumed schematic using the assumed connection points 438 is illustrated in the schematic of FIG. 4B. FIG. 4B is the schematic diagram of FIG. 4A that illustrates the assumed connection points 424, 426 obtained during a hierarchical extraction of the circuit design. Thus, the components illustrated in FIG. 4B are the same as those discussed above with reference to FIG. 4A and include similar numerical designations. In this case, however, the assumed connection points 424, 426 obtained from a hierarchical extraction of the circuit design do not correspond with the actual connections 416, 420, 422 illustrated in FIG. 4A. In particular, the assumed schematic configuration illustrated in FIG. 4B provides for a single connection point 424 to cell E 406 rather than the two actual connections to the cell and does not electrically connect cell E and cell F 408. These inaccuracies may affect the accuracy of a circuit analysis, such as an electromigration analysis.

Figure 5A:
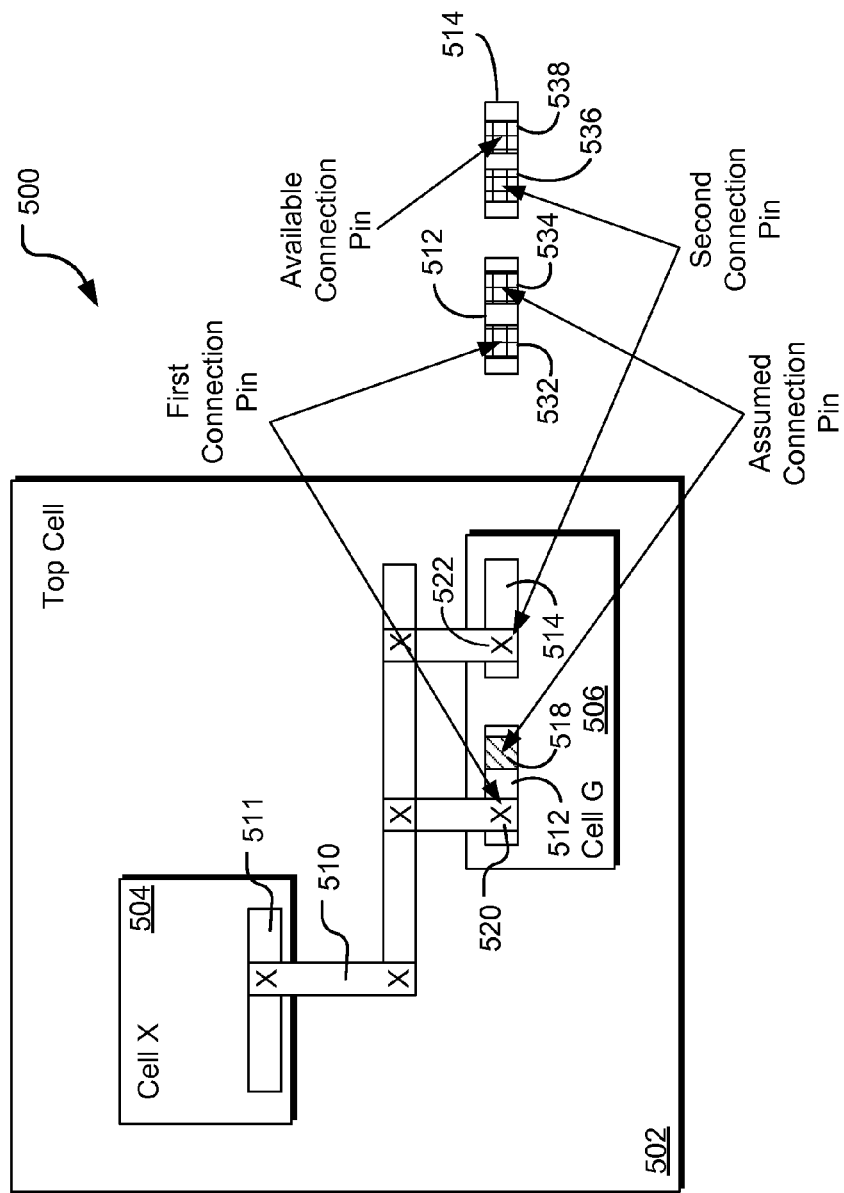
FIG. 5A is a schematic diagram illustrating a top-down view of a portion of a microelectronic design including multiple cells with multiple cell connections to a cell after intelligent connectivity is applied to the design.
Figure 5B:
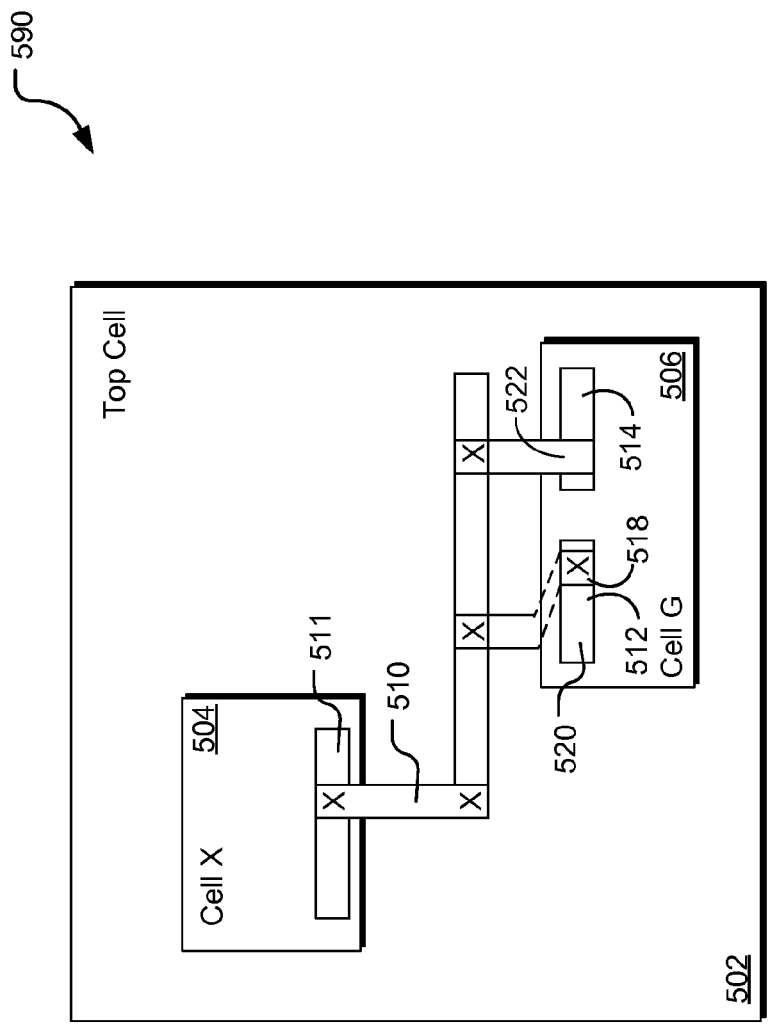
FIG. 5B is the schematic diagram of FIG. 5A before intelligent connectivity is applied to the design.

Another inaccuracy introduced through an assumed connection point of a cell is illustrated in FIGS. 5A and 5B. FIG. 5A is a schematic diagram illustrating a top-down view of a portion of a microelectronic design including multiple cells with multiple cell connections to a cell. The connection scheme illustrated in FIG. 5A is similar to the pillar-type connection discussed above with relation to cell E of FIG. 4A. However, in this example, the cell 506 includes multiple pin layer sections 512, 514 that may be utilized to electrically connect to the cell. This arrangement is typically found in clock cells of a VLSI design.

As shown in FIG. 5A, the circuit 500 includes a top cell 502 that illustrates two sub-cells, cell X 504 and cell G 506. The cells 504, 506 of the circuit 500 are for illustrative use. In general, the circuit 500 may include any number of cells connected in any type of connection scheme through one or more connectors 510. Cell X 504 of the circuit 500 includes a single pin layer 511 or possible connection point to the connectors 510. Cell G 506 has multiple pin layer section 512, 514 that allow for connection to the cell. However, due to the connection of each of the pin layer sections 512, 514 to the connector 510 in the example circuit 500 of FIG. 5A, the pin layer sections 512, 514 are logically equivalent (belong to the same interconnect or net) despite being physically separate.

For the reasons expressed above, the logical equivalency of the pin layer sections 512, 514 of the circuit 500 may not be recognized in a hierarchical extraction of the circuit. Rather, the extraction may treat the pin layer sections 512, 514 as separate, thereby including an inaccuracy into an analysis of the circuit. This can best be seen in the schematic illustrated in FIG. 5B. FIG. 5B is the schematic diagram of FIG. 5A illustrating an assumed connection point 518 obtained during a hierarchical extraction of the circuit design. Thus, the components illustrated in FIG. 5B are the same as those discussed above with reference to FIG. 5A and include similar numerical designations. In this case, however, the assumed connection point 518 obtained from a hierarchical extraction of the circuit design do not correspond with the actual connections 520, 522 illustrated in FIG. 5A.

Utilizing one or more of the techniques described herein, an analysis of the circuit 500, and in particular cell G 506, includes the multiple pin layer sections 512, 514 as logically equivalent to improve the accuracy of an electromigration analysis (or other type of circuit analysis) on the circuit. In particular, information concerning cell G 506 is provided to the analysis tool that identifies the multiple pin layer sections 512, 514 as logically equivalent. As such, during determination of the location of the actual connection point 520, 522 of the connector 510 to the multiple pin layer sections 512, 514, the multiple pin layer sections are identified as logically equivalent and treated as such during the analysis of the circuit. As shown in FIG. 5, the method described above identifies pin connector 532 as a first connection point 520 and pin connector 536 as a second connection point. In addition, the analysis identifies pin connector 532 and pin connector 536 as connection points to the logically same pin layer. The analysis also identifies connection pins 534 and 538 as available. As described above, a hierarchical extraction of the circuit assumes a single connection point 518 at connector pin 534, as shown in the circuit 590 of FIG. 5B. Further, the hierarchical extraction would not recognize that pin layer sections 512, 514 as being logically equivalent, thereby including inaccuracies into any analysis of the circuit 500. However, by using an intelligent coordinate system to identify the actual connection points 520, 522 of the connector 510 to the cell 506, an analysis of the circuit is more accurate and useful for adjusting the design of the circuit.

An additional advantage of the techniques described above is that adjustments to a circuit can be made earlier in the design cycle of the circuit. In general, flat extraction of a circuit design uses a high quality design database which is based on a circuit designs that appear late in the design cycle. Hierarchical extraction, in comparison, can be run at very early stages of circuit design, allowing for adjustments to the design in response to a potential electromigration issue with the design. Designers of the circuit can employ responses to such electromigration issues through one or more known techniques, such as use of a pillar-type connection to one or more of the cells of the design.

Figure 6:
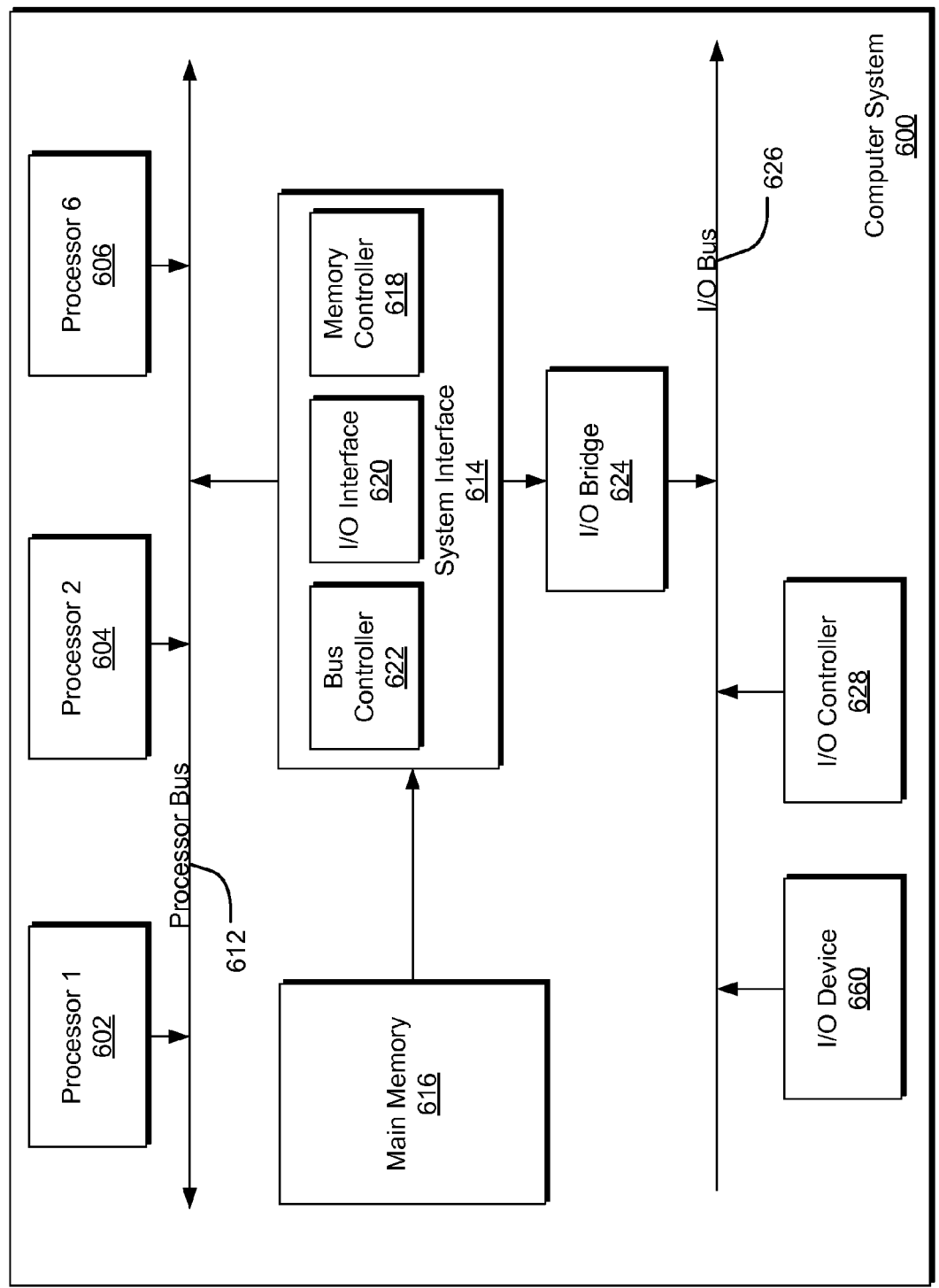
FIG. 6 is an example computing system that may implement various systems and methods discussed herein.

FIG. 6 is a block diagram illustrating an example of a computing device or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for an electromigration analysis of a circuit design comprising:
    obtaining a layout of a top level of the circuit, the layout comprising a position of a plurality of bounding boxes representative of a plurality of cells of the circuit and one or more representations of connectors, the connectors configured to provide an electrical connection between the plurality of cells;
    extracting, through a hierarchical extraction process, design information of at least one cell of the plurality of cells, the design information comprising a pin layer of the at least one cell comprising a plurality of connection locations;
    locating a position of at least one bounding box of at least one cell relative to the top level of the circuit;
    determining an approximate location of an interface between the representations of one or more connectors and the at least one bounding box of the at least one cell relative to the top level of the circuit; and
    associating one of the plurality of connection locations of the pin layer of the cell with the approximate location of the interface; and
    performing an electromigration analysis of the circuit utilizing a computer system and the approximate location of the interface between the representations of one or more connectors and the at least one bounding box of the at least one cell relative to the top level of the circuit as an actual connection point between the one or more connectors and the at least one cell.

2. The method of claim 1 wherein locating the position of the at least one cell relative to the top level of the circuit comprises:
    overlaying the layout of the top level of the circuit with a grid, the grid comprising a plurality of coordinates associated with locations on the layout of the top level of the circuit.

3. The method of claim 2 wherein locating the position of the at least one cell relative to the top level of the circuit further comprises:
    associating one of the plurality of coordinates of the grid to each of the four corners of bounding box of the at least one cell.

4. The method of claim 3 further comprising:
    locating a representation of the pin layer relative to the at least one bounding box representative of the at least one cell.

5. The method of claim 4 wherein locating a representation of the pin layer comprises accessing a mirror-rotation-translation indicator of the at least one bounding box representative of the at least one cell.

6. The method of 5 further comprising:
    utilizing the location of the representation of the pin layer to associate one of the plurality of coordinates of the grid to each of the plurality of connection locations of the pin layer.

7. The method of claim 6 further comprising:
    assigning one of the plurality of coordinates of the grid to the interface between the representations of one or more connectors and the at least one bounding box of the at least one cell relative to the top level of the circuit.

8. The method of claim 7 further comprising:
    calculating a distance from the interface coordinates to each of the connection locations of the pin layer coordinates to determine the connection location coordinate that is closest to the interface coordinate.

9. The method of claim 8 wherein associating one of the plurality of connection locations of the pin layer with the approximate location of the interface comprises setting the connection location coordinate that is closest to the interface coordinate as the approximate location of the interface.

10. A system for an electromigration analysis of a circuit design, the system comprising:
    a processing device; and
    a computer-readable medium with one or more executable instructions stored thereon, wherein the processing device executes the one or more instructions to perform the operations of:
        accessing a top level layout of the circuit design, the layout comprising locations of a plurality of bounding boxes in the top level representative of a plurality of cells of the circuit and one or more representations of electrical connectors between the plurality of cells;
        overlaying the top level layout with a grid, the grid comprising a plurality of coordinates associated with locations on the top level layout;
        locating a relative grid position of at least one bounding box of at least one cell of the plurality of cells;
        determining an approximate grid coordinate for at least one electrical connection location between the representations of the one or more electrical connectors and the at least one bounding box of the at least one cell relative to the top level layout of the circuit;
        extracting, through a hierarchical extraction process, design information of the at least one cell of the plurality of cells;
        performing an electromigration analysis of the circuit utilizing the design information of the at least one cell and the approximate grid location coordinate of the at least one electrical connection location between the representations of the one or more electrical connectors and the at least one bounding box of the at least one cell relative to the top level layout of the circuit.

11. The system of claim 10 wherein the processor further performs the operations of:
    associating one of the plurality of coordinates of the grid to each of the four corners of at least one bounding box of the at least one cell.

12. The system of claim 11 wherein a top level layout of the circuit comprises a mirror-rotation-translation indicator of the at least one bounding box representative of the at least one cell and a representation of a pin layer of the cell, the pin layer comprising a plurality of available connection locations.

13. The system of claim 12 wherein the processor further performs the operations of:
    locating the representation of the pin layer relative to the at least one bounding box representative of the at least one cell from the mirror-rotation-translation indicator of the at least one bounding box representative of the at least one cell; and
    utilizing the location of the representation of the pin layer to associate one of the plurality of coordinates of the grid to each of the plurality of available connection locations of the pin layer.

14. The system of claim 13 wherein the processor further performs the operations of:
    calculating a distance from the approximate grid coordinate for the at least one electrical connection location to each of the grid coordinates of the plurality of available connection locations of the pin layer to determine the available connection location coordinate that is closest to the approximate grid coordinate.

15. The system of claim 14 wherein the design information of the at least one cell of the plurality of cells comprises an assumed connection location between the one or more electrical connectors and the at least one cell, the assumed connection location associated with one of the plurality of available connection locations of the pin layer.

16. The system of claim 15 wherein the processor further performs the operations of:
replacing the assumed connection location between the one or more electrical connectors and the at least one cell with the available connection location coordinate that is closest to the approximate grid coordinate for the at least one electrical connection location.

17. The system of claim 16 wherein the electromigration analysis of the circuit is performed using the replaced available connection location coordinate that is closest to the approximate grid coordinate for the at least one electrical connection location.

18. The system of claim 10 wherein the top level layout of the circuit design comprises at least two electrical connection locations between the representations of the one or more electrical connectors and the at least one bounding box of the at least one cell relative to the top level layout of the circuit.

* * * * *

UNITED STATES PATENT AND TRADEMARK OFFICE
CERTIFICATE OF CORRECTION

| | | |
|---|---|---|
| PATENT NO. | : 9,015,645 B1 | Page 1 of 1 |
| APPLICATION NO. | : 14/062491 | |
| DATED | : April 21, 2015 | |
| INVENTOR(S) | : Pampati et al. | |

It is certified that error appears in the above-identified patent and that said Letters Patent is hereby corrected as shown below:

In the Claims

In column 13, line 58, in Claim 6, delete "of 5" and insert -- of claim 5 --, therefor.

Signed and Sealed this
Sixteenth Day of February, 2016

Michelle K. Lee
*Director of the United States Patent and Trademark Office*